(12) United States Patent
Yang et al.

(10) Patent No.: US 7,643,014 B2
(45) Date of Patent: Jan. 5, 2010

(54) RESISTIVE TOUCH SCREEN MEASUREMENT SYSTEM

(75) Inventors: Chao-Chi Yang, Hsin-Chu (TW); Chung-An Tang, Hsin-Chu Hsien (TW)

(73) Assignee: Elan Microelectronics Corporation, HsinChu (TW)

( * ) Notice: Subject to any disclaimer, the term of this patent is extended or adjusted under 35 U.S.C. 154(b) by 743 days.

(21) Appl. No.: 11/308,009

(22) Filed: Mar. 2, 2006

(65) Prior Publication Data

US 2007/0089914 A1 Apr. 26, 2007

(30) Foreign Application Priority Data

Oct. 6, 2005 (TW) ............................... 94135001 A (51) Int. Cl.
*G06F 3/045* (2006.01)
(52) U.S. Cl. .................................... 345/174; 178/18.05
(58) Field of Classification Search ................. 345/173, 345/174; 178/18.05; 341/136, 144, 161, 341/163
See application file for complete search history.

(56) References Cited

U.S. PATENT DOCUMENTS

| 4,460,891 | A | * | 7/1984 | Bernstein | ..................... 341/156 |
|---|---|---|---|---|---|
| 4,907,002 | A | * | 3/1990 | Kawada | ....................... 341/172 |
| 5,227,793 | A | * | 7/1993 | Aisu | ........................... 341/136 |
| 5,815,103 | A | * | 9/1998 | Comminges et al. | ........ 341/144 |
| 6,037,930 | A | * | 3/2000 | Wolfe et al. | .................. 345/174 |
| 6,556,154 | B1 | * | 4/2003 | Gorecki et al. | .............. 341/118 |
| 6,611,257 | B1 | * | 8/2003 | Dotson et al. | ................ 345/174 |

* cited by examiner

*Primary Examiner*—Bipin Shalwala
*Assistant Examiner*—Steven E Holton
(74) *Attorney, Agent, or Firm*—Winston Hsu (57) ABSTRACT

A voltage is generated after a touch screen is touched, and the voltage is transformed into a digital signal for detecting a touch point which the touch screen is touched. A touch sensing system includes a first switch having a first node coupled to a first voltage source, a second switch having a node coupled to a second voltage source, a first resistor coupled between the first switch and the second switch in a series connection, a comparator having a first input node coupled to a second node of the first switch, a successive approximation register (SAR) having an input node coupled to an output node of the comparator, and a simulation circuit. An output voltage of the simulation circuit is continuously adjusted by the comparator and the simulation circuit to transform the voltage generated on the touch screen into a digital signal.

7 Claims, 10 Drawing Sheets

Fig. 1 Prior Art

| | SW1 | SW2 | SW3 | SW4 | VRT | VRB | AIN |
|---|---|---|---|---|---|---|---|
| Measuring the first coordinate factor | Off | Off | On | On | XP | XN | YP |
| Measuring the second coordinate factor | On | On | Off | Off | YP | YN | XP |

|  | SW1 | SW2 | SW3 | SW4 | VRT | VRB | AIN |
|---|---|---|---|---|---|---|---|
| Measuring the first coordinate factor | Off | Off | On | On | VDD | GND | YP |
| Measuring the second coordinate factor | On | On | Off | Off | VDD | GND | XP |

|  | SW1 | SW2 | SW3 | SW4 | AIN | Output code |
|---|---|---|---|---|---|---|
| Measuring the first coordinate factor | Off | Off | On | On | XP | Code X |
| Measuring the second coordinate factor | On | On | Off | Off | YP | Code Y |

|  | SW1 | SW2 | SW3 | SW4 | VRT | VRB | AIN | Control code |
|---|---|---|---|---|---|---|---|---|
| Measuring the first coordinate factor | Off | Off | On | On | XYPL | XYNL | YP | Code X |
| Measuring the second coordinate factor | On | On | Off | Off | XYPL | XYNL | XP | Code Y |

Fig. 10

RESISTIVE TOUCH SCREEN MEASUREMENT SYSTEM

BACKGROUND OF THE INVENTION

1. Field of the Invention

The present invention relates to a screen measurement system, and more particularly, to a resistive touch screen measurement system.

2. Description of the Prior Art

Primary resistive screen measurement systems in use recently comprise single-ended mode resistive screen measurement systems and differential mode resistive screen measurement systems.

Figure 1:
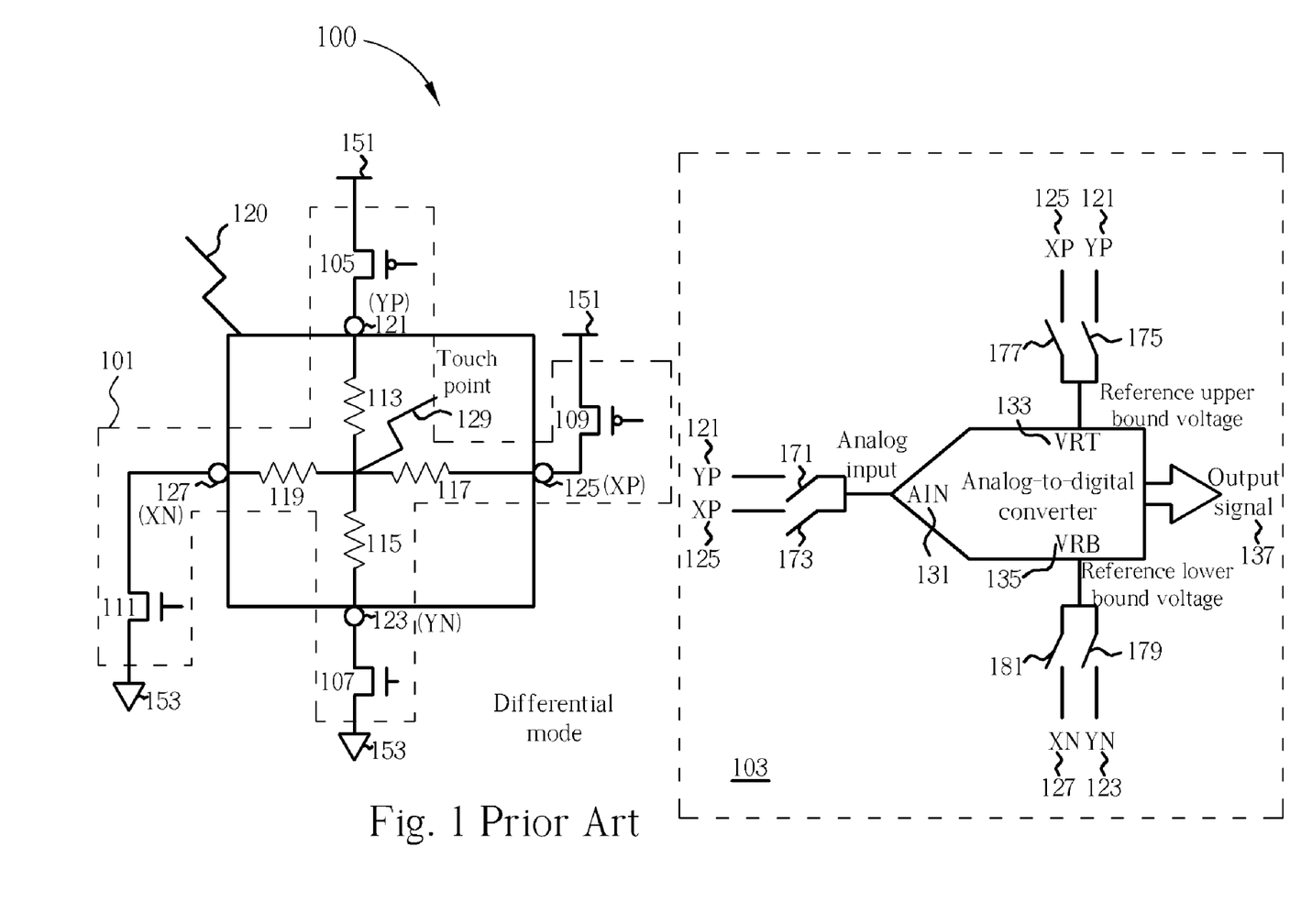
FIG. 1 is a diagram of an equivalent circuit of a resistive touch screen measurement system utilizing the differential mode.

Please refer to FIG. 1, which is a diagram of an equivalent circuit of a resistive touch screen measurement system utilizing the differential mode. Please also refer to FIG. 2, which is a status table of the elements of the resistive touch screen measurement system 100 measuring a first coordinate factor and a second coordinate factor for determining a coordinate of a touch point corresponding to a touch screen. The coordinate is a two-dimensional coordinate utilized for representing a planar position. Therefore, the first coordinate factor represents the X-coordinate of the coordinate, and the second coordinate factor represents the Y-coordinate of the coordinate. The resistive touch screen system 100 comprises a touch-sensing system 101, an analog-to-digital converter 103, and a touch screen 120 disposed on the touch-sensing system 101 for receiving a signal generated from an artificial touch and transmitting the signal to the touch-sensing system 101. The touch screen 120 is not included in the touch-sensing system 101 and overlaps with the touch-sensing system 101. The resistive touch screen measurement system 100 further comprises a first voltage source 151 and a second voltage source 153 for providing a bias voltage of the touch-sensing system 101. The touch sensing system 101 comprises a first transistor 105, a second transistor 107, a third transistor 109, a fourth transistor 111, a first resistor 113, a second resistor 115, a third resistor 117, a fourth resistor 119, and a touch point 129. The first resistor 113 is coupled to the first transistor 105 at a first output 121. The second resistor 115 is coupled to the second transistor 107 at a second output 123. The third resistor 117 is coupled to the third transistor 109 at a third output 125. The fourth resistor 119 is coupled to the fourth transistor 111 at a fourth output 127. The touch point 129 is coupled to the first resistor 113, the second resistor 115, the third resistor 117, and the fourth resistor 119. The analog-to-digital converter 103 comprises an analog input 131, a reference upper bound input 133, a reference lower bound input 135, and a digital output 137. The analog input 131 is coupled to the first output 121 through a switch 171 and is coupled to the third output 125 through a switch 173. The reference upper bound input 133 is coupled to the first output 121 through a switch 175 and is coupled to the third output 125 through a switch 177. The reference lower bound 135 is coupled to the second output 123 through a switch 179 and is coupled to the fourth output 127 through a switch 181. The first resistor 113 and the second resistor 115 are physically the same resistor, and the third resistor 117 and the fourth resistor 119 are physically the same resistor. However, the artificial touch on the touch screen 120 generates a corresponding signal at the touch point 129. Therefore, the artificial touch temporarily separates the first resistor 113 and the second resistor 115. The artificial touch also temporarily separates the third resistor 117 and the fourth resistor 119.

Figure 2:
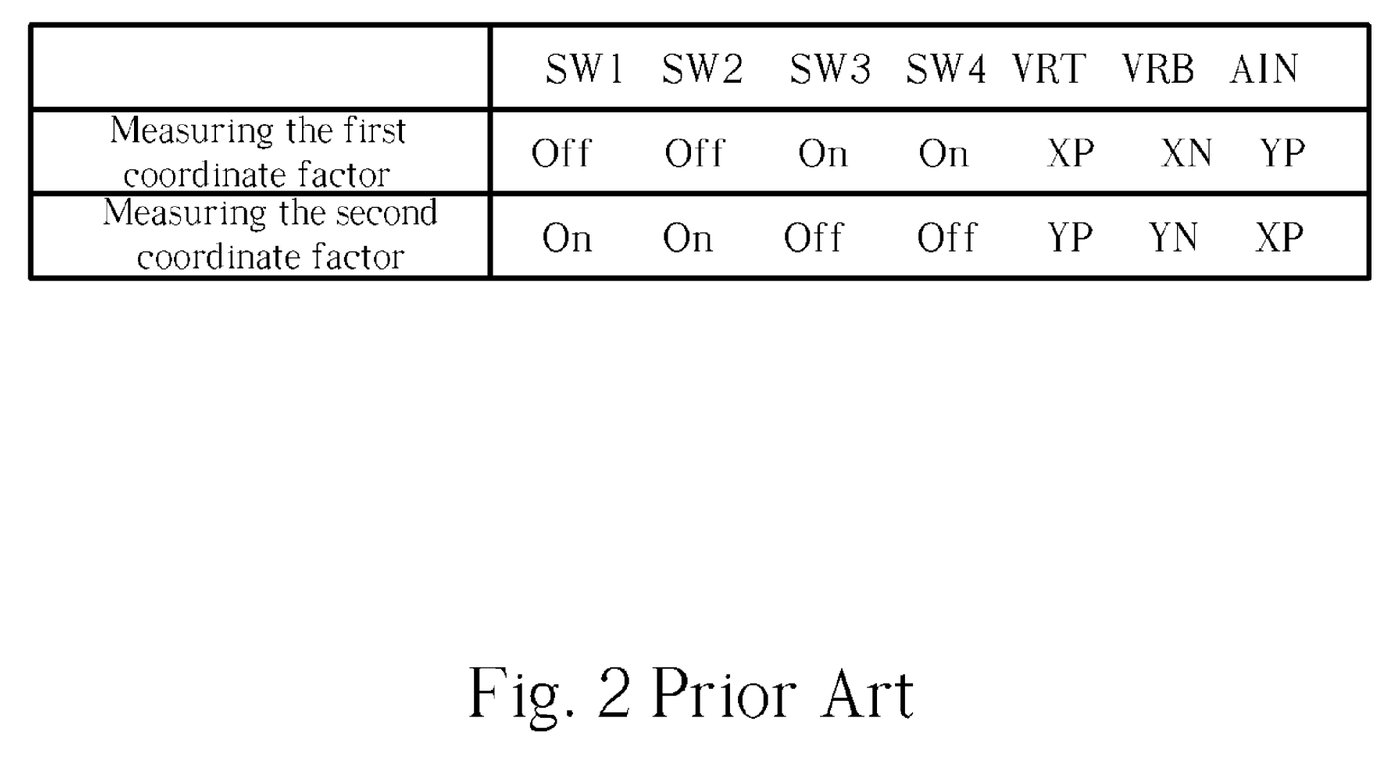
FIG. 2 is a status table of the elements of the resistive touch screen measurement system of FIG. 1 for measuring a first coordinate factor and a second coordinate factor for determining a coordinate of a touch point corresponding to a touch screen.

While measuring the first coordinate factor of the coordinate of the touch point 129 on the touch screen 120, the third transistor 109 and the fourth transistor 111 are both turned on, and the first transistor 105 and the second transistor 107 are both turned off. A first output voltage is generated at the touch point 129, and a second output voltage is generated at the first output 121 from the first output voltage through the first resistor 113. At this time, the switch 171 coupled to the analog input 131 and the first output 121 is turned on, therefore, the second output voltage is inputted to the analog-to-digital converter 103 through the analog input 131. Moreover, the switch 177 coupled to the reference upper bound input 133 and the third output 125 is turned on, and the switch 175 coupled to the reference upper bound input 133 and the first output 121 is turned off. Therefore, the voltage at the third output 125 is inputted to the analog-to-digital converter 103 through the reference upper bound input 133 and is regarded as an upper bound reference voltage. At this time, the switch 181 coupled to the reference lower bound input 135 and the fourth output 127 is turned on, and the switch 179 coupled to the reference lower bound input 135 and the second output 123 is turned off. Therefore, the voltage at the fourth input 127 is inputted to the analog-to-digital converter 103 through the reference lower bound input 135. Through the functions of the analog-to-digital converter 103, the inputted second output voltage is transformed into a corresponding digital signal for representing the first coordinate factor of the coordinate and outputting the first coordinate factor through the digital output 137.

While measuring the second coordinate factor of the coordinate of the touch point 129 on the touch screen 120, the first transistor 105 and the second transistor 107 are turned on, and the third transistor 109 and the fourth transistor 111 are turned off. Therefore, a third output voltage is generated at the touch point 129, and a fourth output voltage is generated from the third output voltage at the third output 125 through the third resistor 117. At this time, the switch 173 coupled to the analog input 131 and the third output 125 is turned on, and the switch 171 coupled to the analog input 131 and the first output 121 is turned off. Therefore, the fourth output voltage is inputted to the analog-to-digital converter 103 through the analog input 131. Moreover, the switch 177 coupled to the reference upper bound input 133 and the third output 125 is turned off, and the switch 175 coupled to the reference upper bound input 133 and the first output 121 is turned on. Therefore, the voltage at the first output 121 is inputted to the analog-to-digital converter 103 through the reference upper bound input 133 and is regarded as an upper bound reference voltage. At this time, the switch 181 coupled to the reference lower bound input 135 and the fourth output 127 is turned off, and the switch 179 coupled to the reference lower bound input 135 and the second output 123 is turned on. Therefore, the voltage at the second output 123 is inputted to the analog-to-digital converter 103 through the reference lower bound input 135 and is regarded as a lower bound reference voltage. Through the functions of the analog-to-digital converter 103, the inputted fourth output voltage is transformed into a corresponding digital signal for representing the second coordinate factor of the coordinate and outputting the second coordinate factor through the digital output 137.

However, while measuring the first coordinate factor of the coordinate of the touch point 129 on the touch screen 120 and after the second output voltage is inputted to the analog-to-digital converter 103, the reference upper bound input 133 must be continuously supplied with the voltage input at the third output 125, and the reference lower bound input 135 must be continuously supplied with the voltage input at the fourth output 127, therefore, the third transistor 109 and the fourth transistor 111 cannot be turned off. If the third transistor 109 and the fourth transistor 111 are turned off at this time, the upper bound reference voltage and the lower bound reference voltage cannot be maintained anymore, and larger offsets are thus generated. Since the third transistor 109 and the fourth transistor 111 cannot be turned off, the third transistor 109 and the fourth transistor 111 must work for a longer time, and a large power consumption caused by not turning off the third transistor 109 and the fourth transistor 111 is thus generated. It means that a resistive touch screen measurement system utilizing the differential mode is in company with a large power consumption.

Figure 3:
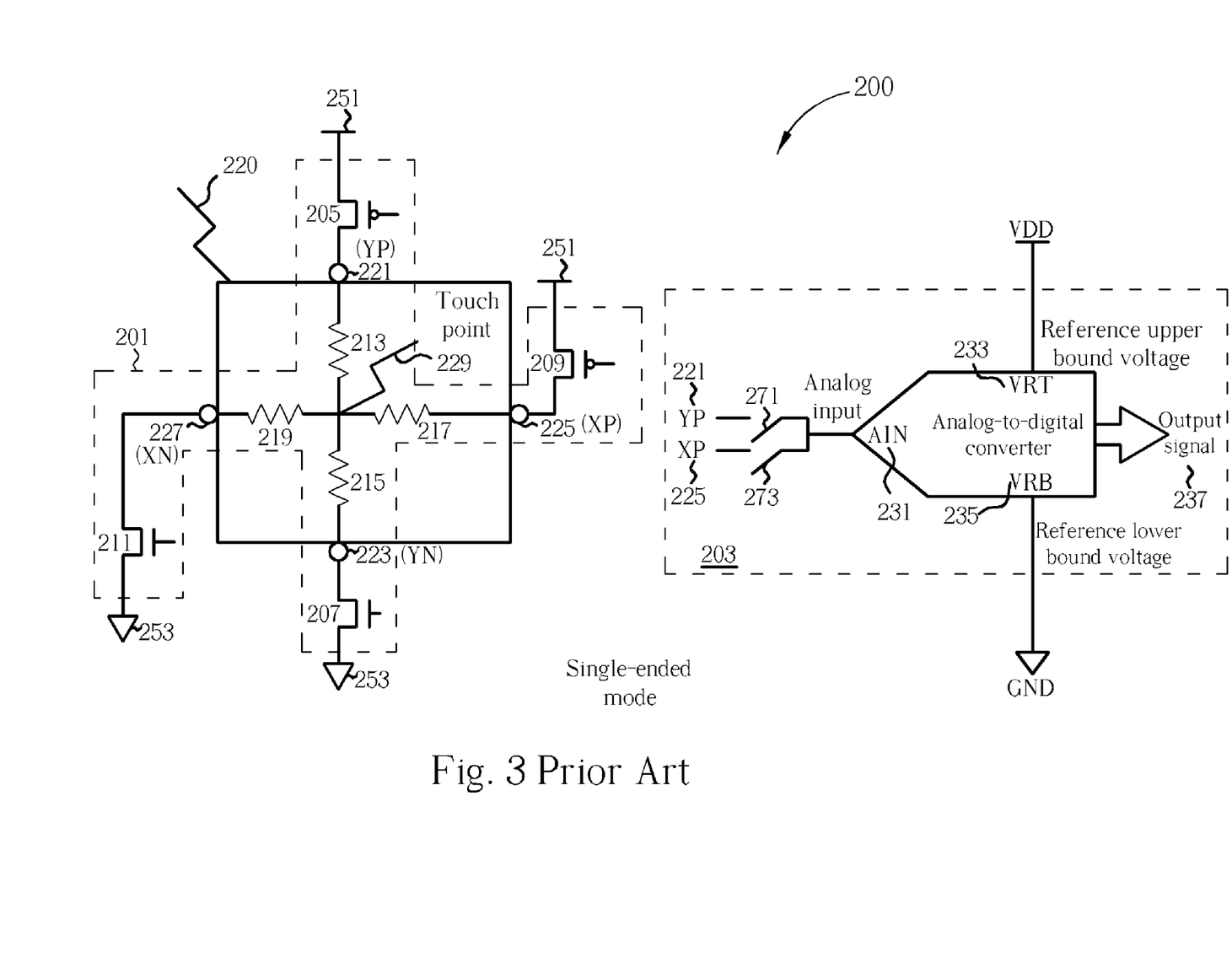
FIG. 3 is a diagram of the resistive touch screen measurement system utilizing a single-ended mode.
Figure 4:
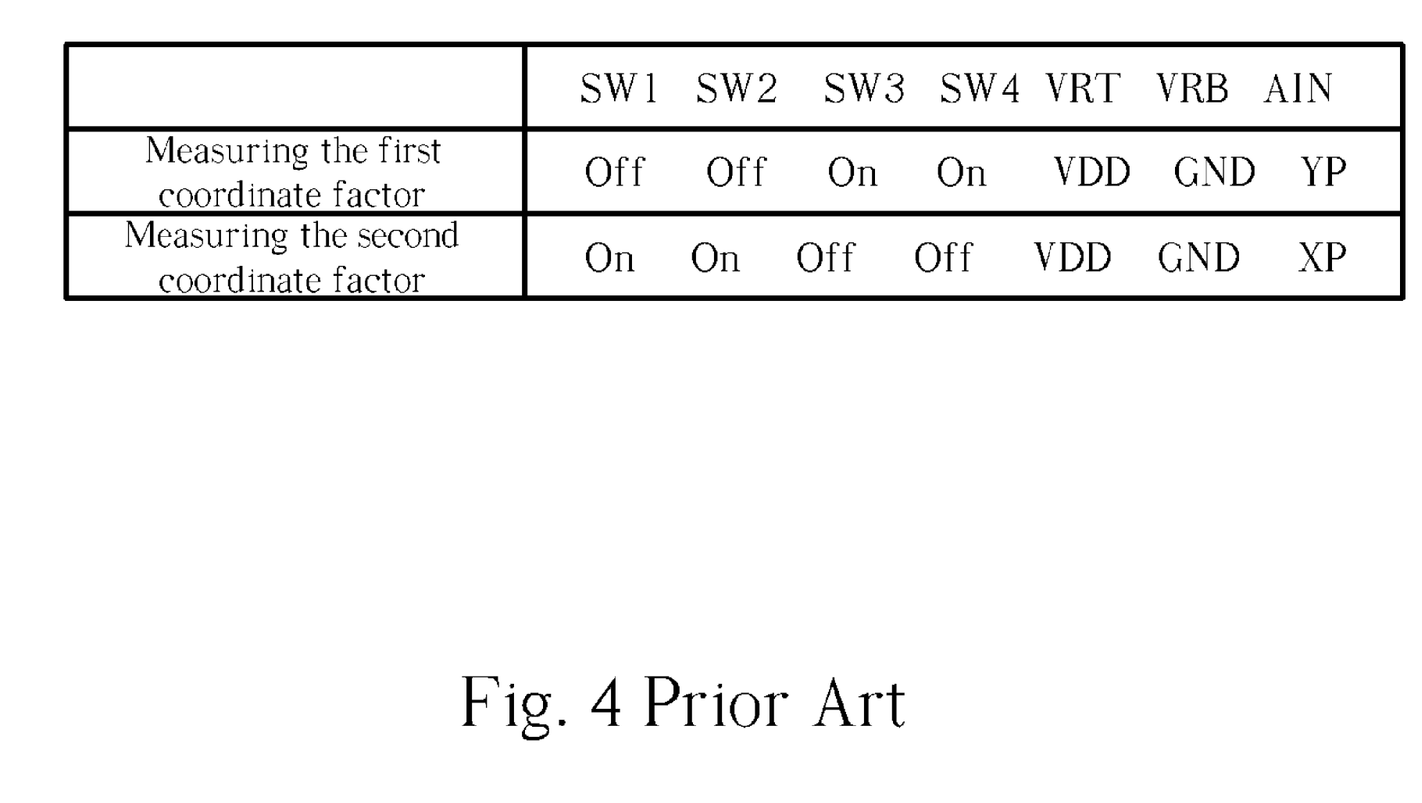
FIG. 4 is a status table of the elements of the resistive touch screen measurement system of FIG. 3 for measuring a first coordinate factor and a second coordinate factor for determining a coordinate of a touch point on a touch screen.

Please refer to FIG. 3, which is a diagram of the resistive touch screen measurement system 200 utilizing a single-ended mode. Please refer to FIG. 4 also. FIG. 4 is a status table of the elements of the resistive touch screen measurement system 200 measuring a first coordinate factor and a second coordinate factor for determining a coordinate of a touch point on a touch screen. The coordinate is a two-dimensional coordinate for representing a planar coordinate as well as in FIG. 1. The first coordinate factor of the coordinate represents the X-coordinate of the coordinate. The second coordinate factor of the coordinate represents the Y-coordinate of the coordinate. The resistive touch screen measurement system 200 comprises a touch-sensing system 201, an analog-to-digital converter 203, and a touch screen 220. The touch screen 220 is disposed above the touch-sensing system 201 for receiving a signal generated from an artificial touch and transmitting the signal to the touch-sensing system 201. In FIG. 3, the touch screen 220 is not comprised by the touch-sensing system 201 and overlaps with the touch-sensing system 201. The resistive touch screen measurement system 200 further comprises a first voltage source 251 and a second voltage source 253 for providing bias voltages to the touch-sensing system 201. The touch-sensing system 201 comprises a first transistor 205, a second transistor 207, a third transistor 209, a fourth transistor 211, a first resistor 213, a second resistor 215, a third resistor 217, a fourth resistor 219, and a touch point 229. The first resistor 213 is coupled to the first transistor 205 through a first output 221. The second resistor 215 is coupled to the second transistor 207 through a second output 223. The third resistor 217 is coupled to the third transistor 209 through a third output 225. The fourth resistor 219 is coupled to the fourth transistor 211 through a fourth output 227. The touch point 229 is coupled to the first resistor 213, the second resistor 215, the third resistor 217, and the fourth resistor 219. The analog-to-digital converter 203 comprises an analog input 231, a reference upper bound input 233, a reference lower bound input 235, and a digital output 237. The analog input 231 is coupled to the first output 221 through a switch 271 and is coupled to the third output 225 through a switch 273. The reference upper bound input 233 is coupled to a direct current (DC) voltage source VDD. The reference lower bound input 235 is coupled to the ground. The first resistor 213 and the second resistor 215 are physically the same resistor. The third resistor 217 and the fourth resistor 219 are physically the same resistor. The artificial touch generated on the touch screen 220 generates a signal on the touch point 229 of the touch-sensing system 201. The artificial touch thus separates the first resistor 213 and the second resistor 215. The artificial touch also separates the third resistor 217 and the fourth resistor 219.

While measuring the first coordinate factor of the coordinate of the touch point 229 on the touch screen 220, the third transistor 209 and the fourth transistor 211 are turned on, and the first transistor 205 and the second transistor 207 are turned off. Therefore, a first output voltage is generated on the touch point 229, and a second output voltage is generated from the first output voltage at the first output 221 through the first resistor 213. At this time, the switch 271 coupled to the analog input 231 and the first output 221 is turned on, and the switch 273 coupled to the analog input 231 and the third output 225 is turned off so that the second output voltage is inputted to the analog-to-digital converter 203 through the analog input 231. Moreover, the DC voltage source VDD at the reference upper bound input 233 is regarded as an upper bound reference voltage, and the ground GND at the reference lower bound input 235 is regarded as a lower bound reference voltage. Through the functions of the analog-to-digital converter 203, the inputted second output voltage coupled is transformed into a corresponding digital signal for representing the first coordinate factor of the coordinate of the touch point and outputting the digital signal from the digital output 237.

While measuring the second coordinate factor of the touch point 229 on the touch screen 220, the first transistor 205 and the second transistor 207 are turned on, and the third transistor 209 and the fourth transistor 211 are turned off. Therefore, a third output voltage is generated at the touch point 229, and a fourth output voltage is generated from the third output voltage at the third output 225 through the third resistor 217. At this time, the switch 273 coupled to the analog input 231 and the third output 225 is turned on, and the switch 271 coupled to the analog input 231 and the first output 221 is turned off. Therefore, the fourth output voltage is inputted to the analog-to-digital converter 203 through the analog input 231. Besides, the DC voltage source VDD at the reference upper bound input 233 is regarded as an upper bound reference voltage, and the ground GND at the reference lower bound input 235 is regarded as a reference lower bound voltage. Through the functions of the analog-to-digital converter 203, the inputted fourth output voltage is transformed into a corresponding digital signal for representing the second coordinate factor of the coordinate of the touch point and outputting the digital signal from the digital output 237.

While measuring the first coordinate factor of the coordinate of the touch point 229 on the touch screen 220 and after the second output voltage is inputted to the analog-to-digital converter 203, the analog-to digital converter 203 does not have to maintain the voltages at the third output 225 and the fourth output 227 in comparison with the analog-to-digital converter 103. Therefore, the power consumption of the resistive touch screen measurement system 200 utilizing the single-ended mode is less than the power consumption of the resistive touch screen measurement system 100 utilizing the differential mode. However, since the upper bound reference voltage of the analog-to-digital converter 203 is the DC voltage source VDD, the lower bound reference voltage of the analog-to-digital converter 203 is the ground GND, the actual voltage at the first output 221 is VDD-Vsd, and the actual voltage at the second output 223 is GND+Vds, therefore, a larger offset is generated in the bias voltage and the gain of the analog-to-digital converter 203. Vsd represents the voltage difference between the source and the drain of the first transistor. Vds represents the voltage difference between the drain and the source of the second transistor 207. The values of Vsd and Vds are both related to bias voltages and temperature of the transistors, and even to the ratio of the width to the length of the transistors. Therefore, the values of Vds and Vsd vary a lot. Moreover, in comparison with the analog-to-digital converter 203, the bias voltage and the gain of the analog-to-digital converter 103 are more precise since the analog-to-digital converter 103 utilizes the voltages outputted at the third output 125 and the fourth output 127 as the upper bound reference voltage and the lower bound reference voltage.

While measuring the second coordinate factor of the coordinate of the touch point 229 on the touch screen 220, the same situation takes place.

SUMMARY OF THE INVENTION

The claimed invention discloses a resistive touch screen measurement system comprises a first switch having a first terminal coupled to a first voltage source, a second switch having one terminal coupled to a second voltage source, a first resistor coupled to the first switch and the second switch in a series connection, a comparator having a first input coupled to a second terminal of the first switch, a successive-approximation register having an input coupled to an output of the comparator, and a simulation circuit. The simulation circuit comprises a second resistor, a third switch having a first terminal coupled to the first voltage source, and a second terminal coupled to the second resistor and a second input of the comparator, a fourth switch coupled to the second resistor and the second voltage source, a fifth switch set having a plurality of switches, each switch coupled to the second resistor and the first voltage source in a parallel connection with the third switch, and a control terminal of each switch of the fifth switch set coupled to an output of a set of outputs of the successive-approximation register, and a sixth switch set having a plurality of switches, each switch coupled to the second resistor and the second voltage source in a parallel connection with the fourth switch, and a control terminal of each switch of the sixth switch set coupled to an output of the set of outputs of the successive-approximation register.

These and other objectives of the present invention will no doubt become obvious to those of ordinary skill in the art after reading the following detailed description of the preferred embodiment that is illustrated in the various figures and drawings.

DETAILED DESCRIPTION

Figure 8:
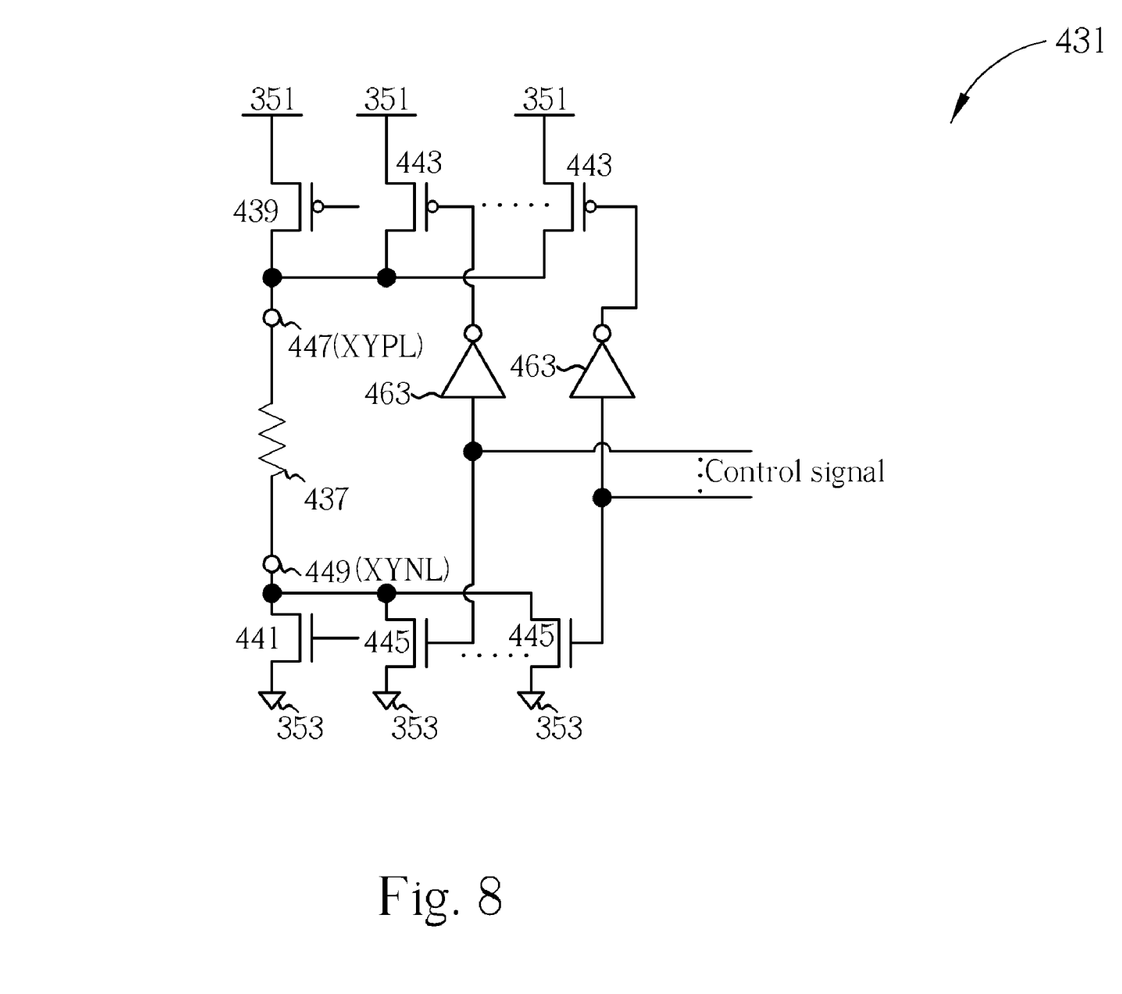
FIG. 8 is a diagram the equivalent circuit of the simulation circuit of the resistive touch screen measurement system of the present invention.
Figure 9:
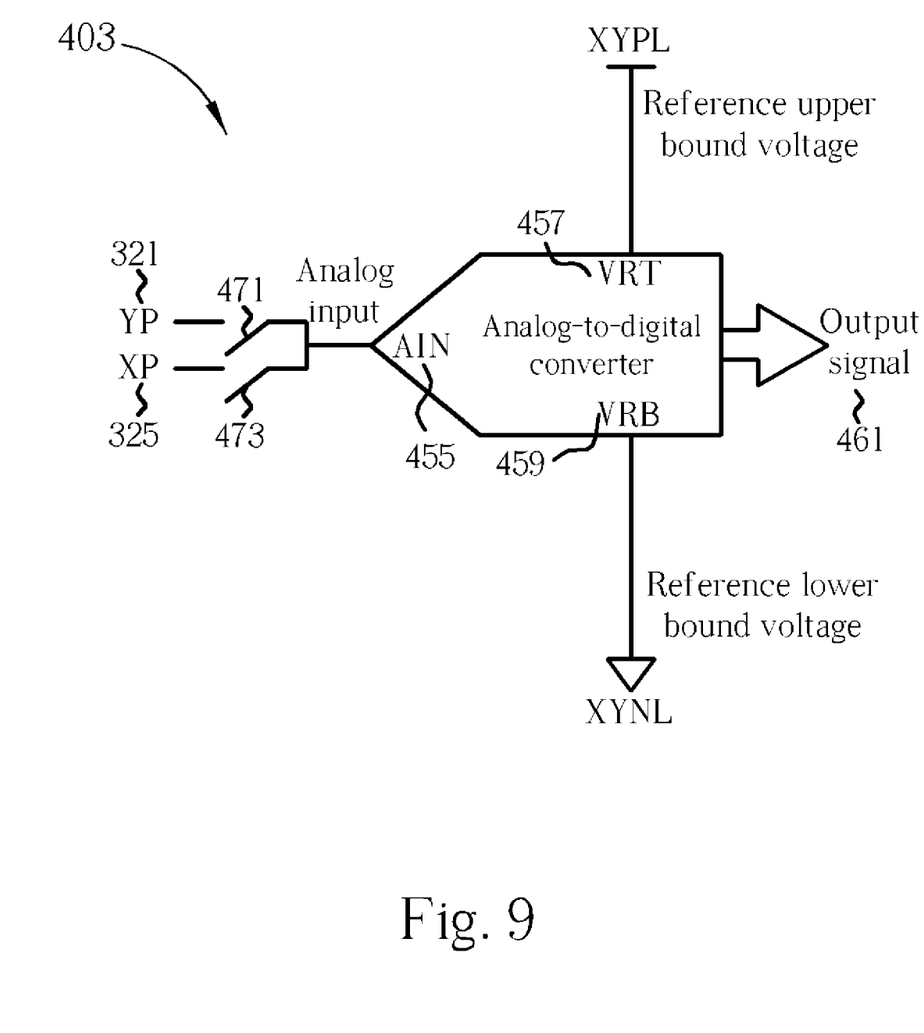
FIG. 9 is a diagram of an analog-to-digital converter of the resistive touch screen measurement system of the present invention.

The operations of the resistive touch screen measurement system of the present invention are predominantly classified into a first phase and a second phase. In the first phase, a digital signal corresponding to the first coordinate factor of the coordinate of the touch point on the touch screen is generated, and a signal corresponding to the second coordinate factor of the coordinate of the touch point on the touch screen is also generated. In the second phase, both the digital signals are utilized for controlling the statuses of two sets of transistors. Therefore, an upper bound reference voltage and a lower bound reference voltage are generated by the both sets of transistors while measuring both coordinate factors of the coordinate of the touch point on the touch screen. The upper bound reference voltage and the lower bound reference voltage are also inputted to an analog-to-digital converter for utilizing the analog-to-digital converter for measuring the coordinate factors of the coordinates of the other touch points on the touch screen. In other words, in comparison to the resistive touch screen measurement system utilizing the single-ended mode, the resistive touch screen measurement system of the present invention neutralizes the offsets of the transistors in advance. Therefore, the offset as shown in FIG. 3 is not generated and reduced power consumption is achieved utilizing the resistive touch screen measurement system 200 of FIG. 3. The procedures in FIG. 5, FIG. 6, and FIG. 7 are related to the first phase, and the procedures in FIG. 5, FIG. 8, and FIG. 9 are related to the second phase.

Figure 5:
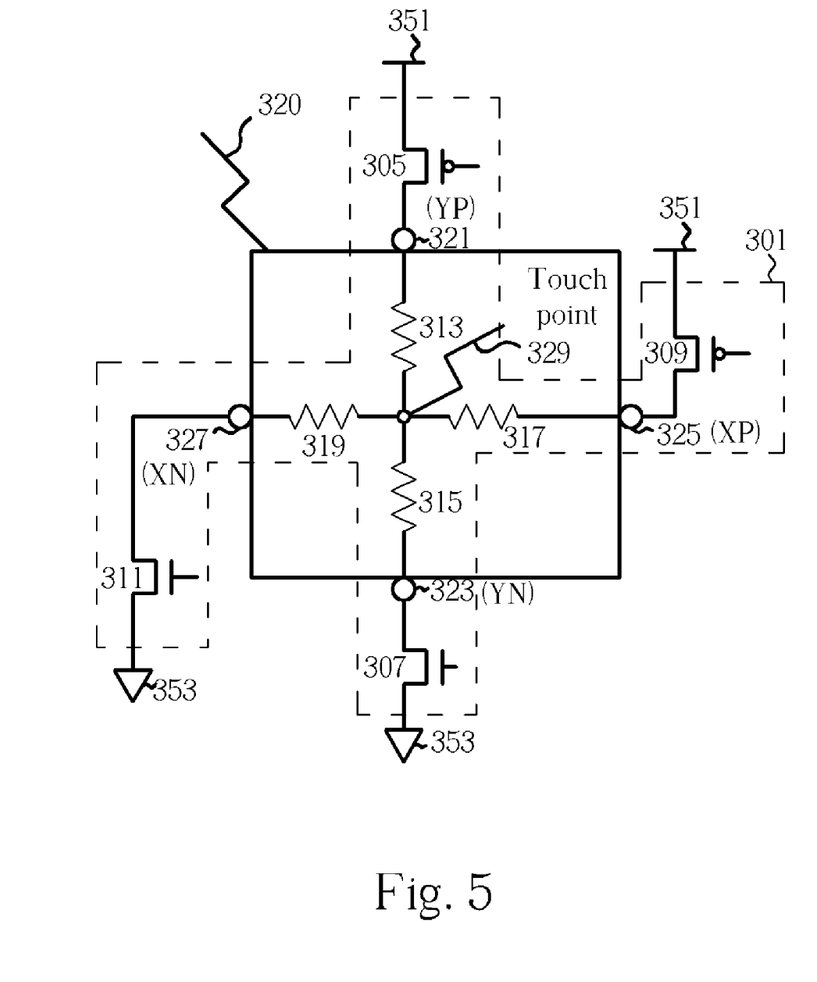
FIG. 5 is a diagram of the equivalent circuit of a touch-sensing system of the resistive touch screen measurement system of the present invention.
Figure 6:
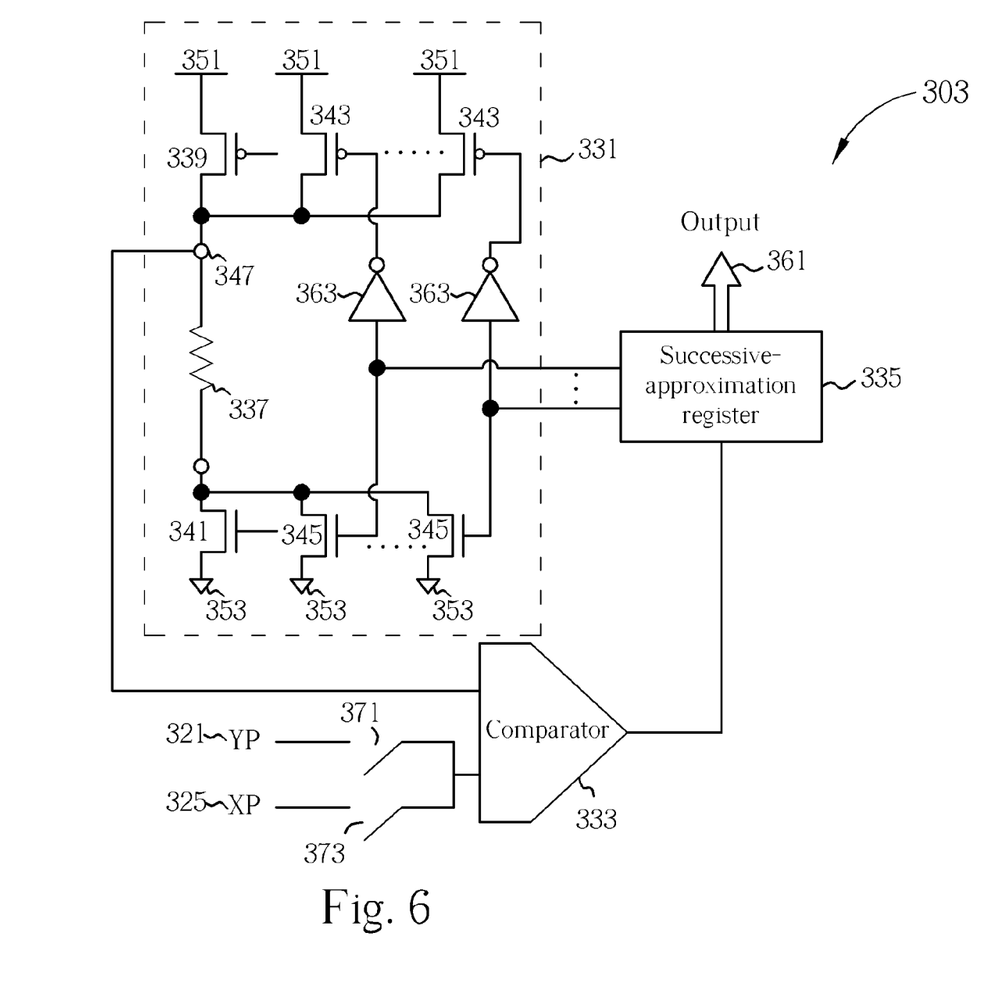
FIG. 6 is a diagram of the equivalent circuit of a signal generating system of the resistive touch screen measurement system of the present invention.
Figure 7:
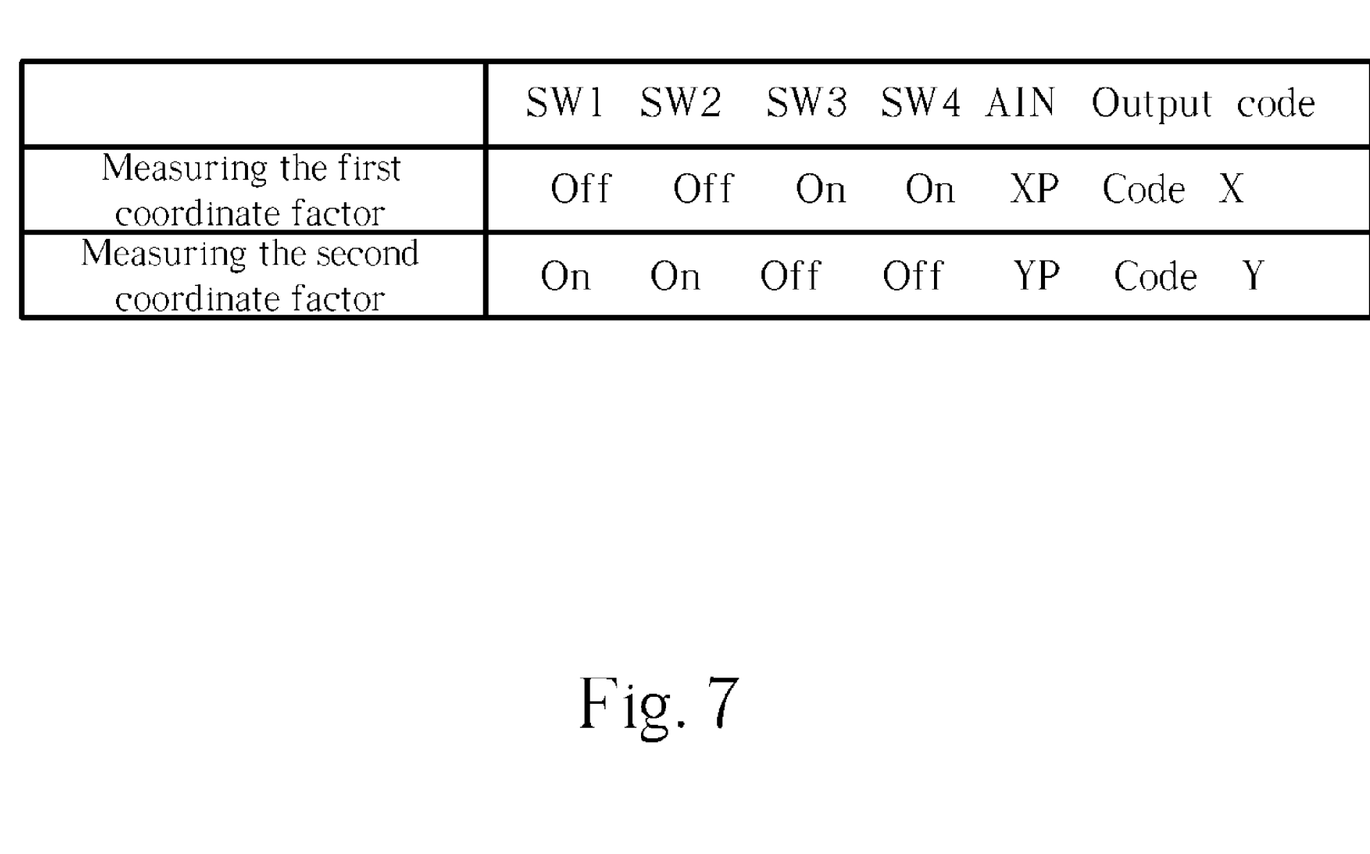
FIG. 7 is the status table of the elements of the resistive touch screen measurement system of the present invention under the first phase.

Please refer to FIG. 5, FIG. 6, and FIG. 7 simultaneously. FIG. 5 is a diagram of the equivalent circuit of a touch-sensing system 301 of the resistive touch screen measurement system of the present invention. FIG. 6 is a diagram of the equivalent circuit of a signal generating system 303 of the resistive touch screen measurement system of the present invention. FIG. 7 is the status table of the elements of the resistive touch screen measurement system under the first phase in the present invention. The resistive touch screen measurement system of the present invention further comprises a first voltage source 351 and a second voltage source 353, and both of the voltage sources are shown in FIG. 5 and FIG. 6. The resistive touch screen measurement system of the present invention further comprises a touch screen 320 disposed above the touch-sensing system 301 for receiving a signal generated from an artificial touch and transmitting the signal to the touch-sensing system 301. In FIG. 5, the touch screen 320 is not comprised in the touch-sensing system 301 and overlaps with the touch-sensing system 301. The touch-sensing system 301 comprises a first transistor 305, a second transistor 307, a third transistor 309, a fourth transistor 311, a first resistor 313, a second resistor 315, a third resistor 317, and a fourth resistor 319. The first transistor 305 has a first terminal coupled to the first voltage source 351. The second transistor 307 has a first terminal coupled to the second voltage source 353. The third transistor 309 has a first terminal coupled to the first voltage source 353. The fourth transistor 311 has a first terminal coupled to the second voltage source 353. The first resistor 313 is coupled to the first transistor 305 through a first output 321. The second resistor 315 is coupled to the second transistor 307 through a second output 323. The third resistor 317 is coupled to the third transistor 309 through a third output 325. The fourth resistor 319 is coupled to the fourth transistor 311 through a fourth output 327. The first resistor 313 and the second resistor 315 are physically the same resistor. The third resistor 317 and the fourth resistor 319 are also physically the same resistor. While a touch point 329 on the touch screen 320 of the touch-sensing system 301 is triggered by an artificial touch, the first resistor 313 and the second resistor 315 are temporarily separated, and the third resistor 317 and the fourth resistor 319 are also temporarily separated. Therefore, the equivalent circuit of the touch-sensing system 301 is thus formed as shown in FIG. 5. As shown in FIG. 5, while measuring a digital signal and triggering the touch point 329, the touch point 329 is coupled to the first resistor 313, the second resistor 315, the third resistor 317, and the fourth resistor 319. The signal generating system 303 comprises a simulation circuit 331, a comparator 333, and a successive-approximation register 335. The comparator 333 has a first input coupled to the first output 321 through a switch 371 and coupled to the second output 325 through a switch 373. The comparator 333 also has a second input coupled to the simulation circuit 331. The successive-approximation register 335 has an output 361. The simulation circuit 331 comprises a fifth resistor 337, a fifth output 347, a fifth transistor 339, a sixth transistor 341, a set of first transistors 343, a set of second transistors 345, and a set of inverters 363. The fifth output 347 is coupled to the fifth resistor 337 and a second input of the comparator 333. The fifth transistor 339 has a first terminal coupled to the first voltage source 351 and a second terminal coupled to the fifth output 347. The sixth transistor 341 is coupled to the fifth resistor 337 and the second voltage source 353. The set of first transistors 343 is coupled to the fifth output 347 and the first voltage source 351 in parallel connection with the fifth transistor 339. The set of second transistors 345 is coupled to the fifth resistor 337 and the second voltage source 353 in parallel connection with the sixth transistor 341. The set of inverters 363 is coupled to the set of first transistors 339 and the set of second transistors 341. Each of the set of first transistors 343 has a control terminal coupled to an output of the set of outputs of the successive-approximation register 335. Each of the set of second transistors 345 also has a control terminal coupled to an output of the set of outputs of the successive-approximation register 335. Each of the set of first transistors 343 corresponds to each of the set of second transistors 345. The set of inverters 363 is utilized to transmit signals from the set of outputs of the successive-approximation register 335 to the control terminal of each of the set of first transistors 343.

In the first phase of the present invention, while a digital signal corresponding to the first factor of the coordinate of the touch point 329 on the touch screen 320 is to be generated, the third transistor 309 and the fourth transistor 311 are turned on, and the first transistor 305 and the second transistor 307 are turned off. Therefore, an output voltage is generated at the third output 325. At this time, the switch 373 coupled to the third output 325 and the comparator 333 is turned on, and the switch 371 coupled to the first output 321 and the comparator 333 is turned off. Therefore, the output voltage is inputted to the first input of the comparator 333. At this time, since no voltage is generated at the fifth output 347, therefore, no voltage is inputted at the second input of the comparator 333 also, and the comparator thus outputs a signal for representing the voltage at the first input is higher than the voltage at the second input. After the signal outputted from the comparator 333 is received at an input of the successive-approximation register 335, a control signal is inputted at each output of the set of the first transistors 343 and the set of the second transistors 345 for turning on or turning off the set of the first transistors 343 and the set of the second transistors 345. The statuses of a transistor of the set of the first transistors 343 and a corresponding transistor of the set of the second transistors 345 are the same. The voltage outputted at the fifth output 347 is also determined by the statuses of the set of the first transistors 343 and the set of the transistors 345 by the successive-approximation register 335 for approximating the output voltage outputted at the third output 325. At this time, a digital signal corresponding to the statuses of the set of the first transistors 343 and the set of the second transistors 345 is recorded and outputted at the output 361 of the successive-approximation register 335 for representing the first coordinate factor of the coordinate of the touch point 329 on the touch screen 320. The digital signal representing the first coordinate factor of the coordinate of the touch point 329 is also denoted as a first digital signal. After outputting the first digital signal, the switch 373 coupled to the third output 325 and the comparator 333 is turned off for preparing for the procedure of measuring the second coordinate factor of the coordinate of the touch point 329 on the touch screen 320.

In the first phase, while measuring the second coordinate factor of the coordinate of the touch point 329 on the touch screen 320, the third transistor 325 and the fourth transistor 327 are turned off, and the first transistor 321 and the second transistor 323 are turned on. Therefore, an output voltage is generated at the first output 321. At this time, the switch 373 coupled to the third output 325 and the comparator 333 is turned off, and the switch 371 coupled to the first output 321 and the comparator 333 is turned on. Therefore, the output voltage is inputted at the first input of the comparator 333. At this time, since no voltage is generated at the fifth output 347, no voltage is generated at the second output of the comparator 333 either, and the comparator outputs a signal for representing the voltage at the first input of the comparator 333 is higher than the voltage at the second input of the comparator 333. After the outputted signal from the comparator 333 is received at an input of the successive-approximation register 335, a control signal is inputted at each input of the set of the first transistors 343 and the set of the second transistors 345 for controlling the statuses of the set of the first transistors 343 and the set of the second transistors 345. The status of a transistor of the set of the first transistors 343 is the same with the status of a corresponding transistor of the set of the second transistors 345. A voltage at the fifth output 347 is thus determined by the statuses of the set of the first transistors 343 and the set of the second transistor 345 by the successive-approximation register 335 for approximating the inputted voltage at the first input of the comparator 333. It also represents that the voltage at the fifth output 347 is thus converged to the output voltage at the first output 321. At this time, a digital signal representing the statuses of the set of the first transistors 343 and the set of the second transistors 345 is recorded and outputted at the output 361 of the successive-approximation register 335 for representing the second coordinate factor of the coordinate of the touch point 329 on the touch screen 320. The recorded digital signal is also denoted as a second digital signal. After outputting the second digital signal, the switch 371 coupled to the first 321 and the comparator 333 is turned off for preparing for the second phase of the present invention. After the first digital signal and the second digital signal are outputted, since the first transistor 305 and the second transistor 307 are turned off right away as well as the third transistor 309 and the fourth transistor 311, the power consumption of the transistors is decreased as well as the single-ended mode.

The voltages Vds and Vsd mentioned in FIG. 3 are easily affected by the temperature, bias voltages, and the ratio of the width to the length of the transistors. In FIG. 5, each transistor of the set of the first transistors 343 and the set of the second transistors 345 is in parallel connection and close to each other, therefore, the transistors in parallel connection almost work at the same temperature. Since each transistor of the set of the first transistors 343 is coupled to the first voltage source 351, each transistor of the set of the first transistors 343 works under the same bias voltage. And since each transistor of the set of the second transistors 345 is coupled to the second voltage source 353, each transistor of the set of the second transistors 345 works under the same bias voltage. Since the variable factors such as temperature and bias voltage are eliminated by such designs, the values of the voltages Vsd and Vds can be determined by the ratios of the width to the length of the set of the transistors. However, the lengths of the set of the first transistors 343 are the same, and the lengths of the set of the second transistor 345 are the same. Therefore, the values of the voltages Vsd and Vds can merely be determined by the sum of the widths of the transistors being turned on. In other words, the outputted voltage at the fifth output 347 is determined by the number of the transistors turned on. Furthermore, while the voltages at both the inputs of the comparators are nearly equal to each other, the digital signal corresponding to the statuses of the transistors in parallel connection is utilized for representing the first coordinate factor and the second coordinate factor of the coordinate of the touch point 329 on the touch screen 320.

Figure 10:
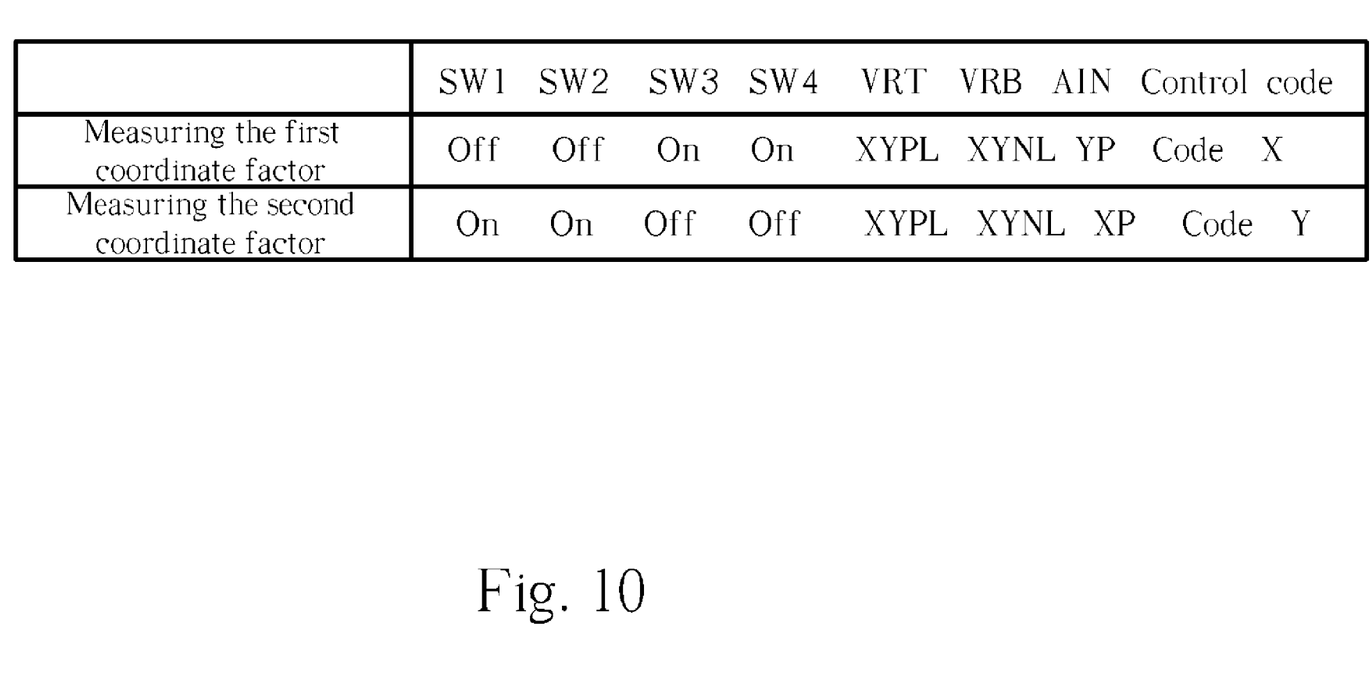
FIG. 10 is a status table of the elements of the resistive touch screen measurement system of the present invention under the second phase.

Please refer to FIG. 5, FIG. 8, FIG. 9, and FIG. 10. FIG. 8 is a diagram the equivalent circuit of the simulation circuit 431 of the resistive touch screen measurement system of the present invention. FIG. 9 is a diagram of an analog-to-digital converter 403 of the resistive touch screen measurement system of the present invention. FIG. 10 is a status table of the elements of the resistive touch screen measurement system of the present invention under the second phase. The simulation circuit 431 comprises a fifth resistor 437, a fifth output 447, a sixth output 449, a fifth transistor 439, a sixth transistor 441, a set of first transistors 443, a set of second transistors 445, and a set of inverters 463. The fifth output 447 is coupled to a first terminal of the fifth resistor 437. The sixth output 449 is coupled to a second terminal of the fifth resistor 437. The fifth switch 439 is coupled to the first voltage source 351 and the fifth output 447. The sixth transistor 441 is coupled to the second voltage source 353 and the sixth output 449. The set of first transistors 443 is coupled to the first voltage source 351 and the fifth output 447 in parallel connection with the fifth transistor 439. The set of the second transistors 445 is coupled to the second voltage 353 and the sixth output 449 in parallel connection with the sixth transistor 441. The set of inverters 463 is coupled to the set of the first transistors 439 and the set of the second transistors 441. A control terminal of each transistor of the set of the first transistors 443 is coupled to an output of a set of control signals. A control terminal of each transistor of the set of the second transistors 445 is also coupled to an output of the set of control signals. The set of control signals is the first digital signal and the second digital signal generated in the first phase and outputted by the successive-approximation register 335 in FIG. 6, the first digital signal utilized for representing the first coordinate factor of the coordinate of the touch point 329 on the touch screen 320, the second digital utilized for representing the second coordinate factor of the coordinate of the touch point 329 on the touch screen 320. Each transistor of the set of the first transistors 443 corresponds to each transistor of the set of the second transistors 445. The set of inverters 463 is utilized for transmitting the set of digital signals outputted at the output 361 of the signal generating system 303 shown in FIG. 6 to a control terminal of each transistor of the set of the first transistors 443. The analog-to-digital converter 403 comprises an analog input 455, a reference upper bound input 457, a reference lower bound input 459, and a digital output 461. The analog input 455 is coupled to the first output 321 through a switch 471 and is coupled to the third output 325 through a switch 473. The reference upper bound input 457 is coupled to the fifth output 447. The reference lower bound input 459 is coupled to the sixth output 449.

In the second phase, while measuring the first coordinate factor of the coordinate of the touch point 329 on the touch screen 320, the third transistor 309 and the fourth transistor 311 are turned on, and the first transistor 305 and the second transistor 307 are turned off. Therefore, an output voltage is generated at the first output 321. At this time, the switch 471 coupled to the first output 321 and the analog input 455 of the analog-to-digital converter 403 is turned on, and the switch 473 coupled to the third output 325 and the analog input 455 of the analog-to-digital converter 403 is turned off. Therefore, the output voltage can be directly inputted at the analog input 455. At this time, a control signal coupled to a control terminal of each transistor of the set of the first transistors 443 and the set of the second transistors 445 is utilized for controlling the statuses of both the sets of transistors. Therefore, an upper bound reference voltage a little higher than the output voltage is generated at the fifth output 447, and a lower bound reference voltage a little lower than the output voltage is also generated at the sixth output 449. The control signal is the first digital signal utilized for representing the first coordinate factor of the coordinate 329 on the touch screen 320 and outputted by the successive-approximation register 335 in the first phase of the present invention. The reference upper bound voltage is then inputted at the reference upper bound input 457 of the analog-to-digital converter 403 and is regarded as an upper bound of the reference voltage utilized by the analog-to-digital converter 403. The reference lower bound voltage is also inputted at the reference lower bound input 459 of the analog-to-digital converter 403 and is regarded as a lower bound of the reference voltage utilized by the analog-to-digital converter 403. Through the functions of the analog-to-digital converter 403 and both the reference upper bound voltage and the reference lower bound voltage, the inputted output voltage is transformed into a digital signal for representing the first coordinate factor of the coordinate of the touch point 329 on the touch screen 320 and outputted at the digital output 461. After outputting the digital signal representing the first coordinate factor, the switch 471 coupled to the first output 321 and the analog-to-digital converter 403 is turned off for preparing for the procedure of measuring the second coordinate factor of the coordinate of the touch point 329 on the touch screen 320.

In the second phase, while measuring the second coordinate factor of the coordinate of the touch point 329 on the touch screen 320, the third transistor 309 and the fourth transistor 311 are turned off, and the first transistor 305 and the second transistor 307 are turned on, therefore, a second output voltage is generated at the third output 325. At this time, the switch 471 coupled to the first output 321 and the analog input 455 of the analog-to-digital converter 403 is turned off, and the switch 473 coupled to the third output 325 and the analog input 455 of the analog-to-digital converter 403 is turned on, therefore, the second output voltage is directly inputted at the analog input 455. At this time, a control signal coupled to a control terminal of each transistor of the set of the first transistors 443 and the set of the second transistors 445 is utilized for controlling the statuses of both the sets of the transistors. Therefore, a reference upper bound voltage a little higher than the second output voltage is generated at the fifth output 447, and a reference lower bound voltage a little lower than the second output voltage is generated at the sixth output 449. The control signal is the second digital signal outputted from the successive-approximation register 335 at the first phase of the present invention and utilized for representing the second coordinate factor of the coordinate of the touch point 329 on the touch screen 320. The reference upper bound voltage is inputted at the reference upper bound input 457 of the analog-to-digital converter 403, and the reference lower bound voltage is inputted at the reference lower bound input 459 of the analog-to-digital converter 403. Through the functions of the analog-to-digital converter 403, the reference upper bound voltage, and the reference lower bound voltage, the inputted second output voltage is transformed into a corresponding digital signal representing the second coordinate factor of the coordinate of the touch point 329 on the touch screen 320, and the digital signal is then outputted from the digital output 461. After outputting the digital signal representing the second coordinate factor, the switch 473 coupled to the third output 325 and the analog input 455 of the analog-to-digital converter 403 is turned off. Then the second phase of the present invention is executed again for measuring a first coordinate factor and a second coordinate factor of the coordinate of another touch point on the touch screen 320.

In the present invention, the principle of determining the first coordinate factor and the second coordinate factor of the touch point on the touch screen is summarized as follows. First, in the first phase, a set of reference digital signals is determined according to the statuses of the transistors in parallel connection as shown in FIG. 6. Second, in the second phase, the set of reference digital signals is utilized for controlling the statuses of both the sets of the transistors in parallel connection and for generating a reference upper bound voltage at the fifth output 447 and a reference lower bound voltage at the sixth output 449. The reference upper bound voltage and the reference lower bound voltage are utilized for compensating for the offsets of the transistors in the single-ended mode in advance. The present invention also utilizes the output voltage generated from the touch-sensing system as well as the differential mode, therefore, the precision of the present invention is the same with the differential mode. The set of digital signals for generating reference voltages is maintained in the simulation circuit so that the resistive touch screen measurement system of the present invention may repeatedly measure various coordinates of consecutive touch points.

The resistive touch screen measurement system of the present invention is a little similar with the resistive touch screen measurement system of the single-ended mode. The difference between the resistive touch screen measurement systems of the present invention and the single-ended mode is the reference upper bound voltage and the reference lower bound voltage. The reference upper bound voltage of the single-ended mode is the DC voltage source VDD whereas the reference upper bound voltage in the present invention is determined from the output voltage at the touch point. The reference lower bound voltage of the single-ended mode is the ground GND whereas the reference lower bound voltage in the present invention is also determined from the output voltage at the touch point. After inputting the reference upper bound voltage and the reference lower bound voltage determined by the set of digital signals outputted in the first phase to the analog-to-digital converter, the first transistor and the second transistor of the touch-sensing system can be immediately turned off as well as the third transistor and the fourth transistor of the touch-sensing system. Therefore, the power consumption of the present invention is decreased to the same level as the single-ended mode and is much less than the differential mode having a large power consumption. In summary, the resistive touch screen measurement system of the present invention has the precision of the differential mode and the low power consumption of the single-ended mode simultaneously.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A resistive touch screen measurement system comprising:
   a first switch having a first terminal coupled to a first voltage source;
   a second switch having one terminal coupled to a second voltage source;
   a first resistor coupled to the first switch and the second switch in a series connection;
   a comparator having a first input coupled to a second terminal of the first switch;
   a successive-approximation register having an input coupled to an output of the comparator; and
   a simulation circuit comprising:
      a second resistor;
      a third switch having a first terminal coupled to the first voltage source, and a second terminal coupled to the second resistor and a second input of the comparator;
      a fourth switch coupled to the second resistor and the second voltage source;
      a fifth switch set having a plurality of switches, each switch coupled to the second resistor and the first voltage source in a parallel connection with the third switch, and a control terminal of each switch of the fifth switch set coupled to an output of a set of outputs of the successive-approximation register;
      a sixth switch set having a plurality of switches, each switch coupled to the second resistor and the second voltage source in a parallel connection with the fourth switch, and a control terminal of each switch of the sixth switch set coupled to an output of the set of outputs of the successive-approximation register; and
      a set of inverters, each inverter coupled to a control terminal of a switch of the fifth switch set and an output of the outputs of the successive-approximation register.

2. The touch screen measurement system of claim 1 wherein the first switch, the third switch, and all the switches of the fifth switch set are P-type metal oxide semiconductors (PMOS).

3. The touch screen measurement system of claim 1 wherein the second switch, the fourth switch, and all the switches of the sixth switch set are N-type metal oxide semiconductors (NMOS).

4. The touch screen measurement system of claim 1 further comprising a seventh switch coupled to the first input of the comparator and a second terminal of the first switch.

5. The touch screen measurement system of claim 1 further comprising:
   an eighth switch having a first terminal coupled to the first voltage source;
   a ninth switch having a terminal coupled to the second voltage source;
   a third resistor coupled to the eighth switch and the ninth switch in a series connection; and
   a tenth switch coupled to the first input of the comparator and a second terminal of the eighth switch.

6. The touch screen measurement system of claim 5 wherein the eighth switch is a P-type metal oxide semiconductor.

7. The touch screen measurement system of claim 5 wherein the ninth switch is an N-type metal oxide semiconductor.

* * * * *